US008812461B2

(12) United States Patent
Li et al.

(10) Patent No.: US 8,812,461 B2
(45) Date of Patent: Aug. 19, 2014

(54) METHOD AND SYSTEM FOR DATA DEDUPLICATION

(71) Applicant: International Business Machines Corporation, Armonk, NY (US)

(72) Inventors: Yan Xin Li, Beijing (CN); Yu Meng Li, Beijing (CN); Li Na Wang, Beijing (CN); Jing Wen, Beijing (CN); Yin Xiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/622,838

(22) Filed: Sep. 19, 2012

(65) Prior Publication Data

US 2013/0086009 A1    Apr. 4, 2013

(30) Foreign Application Priority Data

Sep. 29, 2011    (CN) .......................... 2011 1 0304388

(51) Int. Cl.
*G06F 17/30* (2006.01)

(52) U.S. Cl.
USPC ....................................... 707/692

(58) Field of Classification Search
None
See application file for complete search history.

(56) References Cited

U.S. PATENT DOCUMENTS

| 7,519,635 | B1 | 4/2009 | Haustein et al. | |
| 7,814,074 | B2 | 10/2010 | Anglin et al. | |
| 7,996,371 | B1* | 8/2011 | Deshmukh | 707/692 |
| 2010/0125553 | A1 | 5/2010 | Huang et al. | |
| 2010/0223441 | A1 | 9/2010 | Lillibridge et al. | |
| 2011/0099351 | A1 | 4/2011 | Condict | |
| 2011/0218969 | A1* | 9/2011 | Anglin et al. | 707/679 |

FOREIGN PATENT DOCUMENTS

WO    2010015648    2/2010

OTHER PUBLICATIONS

C. Constantinescu, "Compression for Data Archiving and Backup Revisited", Mathematics for Signal and Information Processing. Edited by Schmalz, Mark S.; Ritter, Gerhard X.; Barrera, Junior; Astola, Jaakko T.; Luk, Franklin T.. Proceedings of the SPIE, vol. 7444, dated 2009, pp. 12.

G. Lu et al., "Frequency Based Chunking for Data De-Duplication", MACOTS '10 Proceedings of the 2010 IEEE/ACM International Symposium on Modeling, Analysis and Simulation of Computer and Telecommunication Systems, dated 2010, pp. 11.

M. Storer et al., "Secure Data Deduplication", Proceedings of the ACM Conference on Computer and Communications Security, dated 2008, pp. 10.

T. Thwel et al., "An Efficient Indexing Machanism for Data Deduplication", Current Trends in Information Technology (CTIT), 2009 International Conference, pp. 5.

G. Wang et al., "Research on a Clustering Data De-Duplication Mechanism Based on Bloom Filter", Multimedia Technology (ICMT), 2010 International Conference, pp. 5.

* cited by examiner

*Primary Examiner* — Tony Mahmoudi
*Assistant Examiner* — Umar Mian
(74) *Attorney, Agent, or Firm* — Janaki K. Davda; Konrad, Raynes, Davda and Victor LLP (57) ABSTRACT

The present disclosure discloses a method and system for data deduplication. The method comprises: acquiring meta data and multiple data chunks corresponding to at least one original data object, which are generated by using a data deduplication method; combining the acquired multiple data chunks into a new data object; performing deduplication on the new data object to generate new meta data and new data chunks corresponding to the new data object; and storing the meta data corresponding to the at least one original data object, the new meta data corresponding to the new data object, and the new data chunks. The method and system can further improve deduplication ratio, lower data storage amount, and save costs.

18 Claims, 3 Drawing Sheets

FIG.1

Prior Art

METHOD AND SYSTEM FOR DATA DEDUPLICATION

CROSS-REFERENCE TO RELATED FOREIGN APPLICATION

This application is a non-provisional application that claims priority benefits under Title 35, Unites States Code, Section 119(a)-(d) from Chinese Patent Application entitled "A Method and System for Data Deduplication" by Yan Xin Li, Yu Meng Li, Li Na Wang, Jing Wen, Yin Xiang Xiong, having Chinese Patent Application No. 201110304388.0, filed on Sep. 29, 2011, which application is incorporated herein by reference in its entirety.

TECHNICAL FIELD

The present disclosure relates to data backup, and more specifically, to a method and system for data deduplication.

DESCRIPTION OF THE RELATED ART

Data backup is a procedure of maintaining data in a certain manner for re-utilization in case of the system is destroyed or in other specific situations. Data backup is a critical component in the field of storage, and has a status and effect that can not be disregarded in storage systems. For an IT system, backup is an indispensable component, because it not only can prevent system break down due to accidental events, but also is the best manner to archive history data, that is, making it possible to implement enquiry, statistic and analysis on history data, and archive important information.

Figure 1:
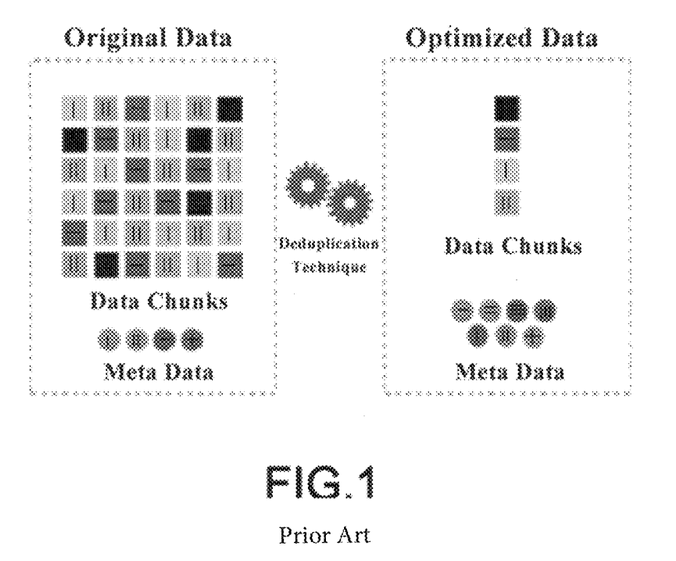
FIG. 1 is a schematic illustration of a data deduplication technique.

Data deduplication, through deleting duplicated data in a data set and for duplicated data only save one copy of that data to eliminate redundancy, is a mainstream and very popular storage technique at present. FIG. 1 shows a schematic illustration of the data deduplication. According to FIG. 1, there are a plenty of duplicated data in the original data, through utilizing data deduplication, data optimized for storage can be obtained, and it is obvious that the stored optimized data needs a greatly reduced storage space. Presently, the data deduplication has been widely adopted in data backup and archive systems, which is helpful to reduce the amount of data storage for an application, save network bandwidth, improve storage efficiency, and thereby save costs.

There are two principle performance metrics for a data deduplication technique, that is, deduplication ratio and the execution performance of a data deduplication method. The execution performance of a data deduplication method depends on specific implementation, and the deduplication ratio depends on nature of data and application modes. Presently, manufactures have provided many data deduplication methods, for example, fixed size partition, varied-size partition, and the like. However, the deduplication ratio of the data is fixed after removing duplicated data chunks stored through current data chunk-level deduplication techniques, and storage and transfer costs can be further saved through improving deduplication ratio, which is a target continuously sought by every vendor. Therefore, it is desired to develop a data deduplication method and system with higher deduplication ratio.

SUMMARY OF THE INVENTION

Thus, it is needed to provide a method and system for data deduplication capable of further improving deduplication ratio, further reducing data storage amount, lowering storage costs accordingly.

According to one aspect of the present disclosure, there is provided a method for data deduplication. The method comprises:

a) acquiring meta data corresponding to at least one original data object and multiple data chunks generated by using the deduplication method;

b) combining the acquired multiple data chunks into a new data object;

c) performing deduplication on the new data object to generate new meta data corresponding to the new data object and new data chunks; and d) storing the meta data corresponding to the at least one original data object, the new meta data corresponding to the new data object, and the new data chunks.

According to another aspect of the present disclosure, there is provided a system for data deduplication. The system comprises:

an acquiring unit configured to acquire meta data corresponding to at least one original data object and multiple data chunks generated by using a data deduplication method;

a combining unit configured to combine the acquired multiple data chunks into a new data object;

a deduplication unit configured to perform deduplication on the new data object to generate new meta data corresponding to the new data object and new data chunks; and a storing unit configured to store the meta data corresponding to the at least one original data object, the new meta data corresponding to the new data object and the new data chunks.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION OF THE PREFERRED EMBODIMENT

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 2:
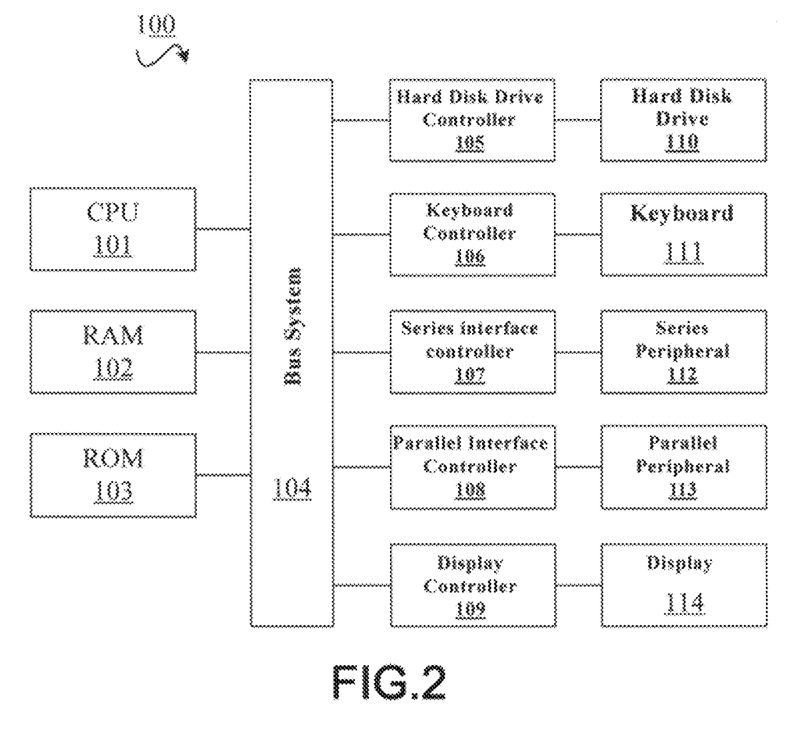
FIG. 2 is a block diagram of an exemplary computing system 100 suitable for implementing the embodiments of the present disclosure.

FIG. 2 shows an exemplary computer system 100 which is applicable to implement the embodiments of the present disclosure. As shown in FIG. 2, the computer system 100 may include: CPU (Central Process Unit) 101, RAM (Random Access Memory) 102, ROM (Read Only Memory) 103, system bus 104, hard disk drive controller 105, keyboard controller 106, serial interface controller 107, parallel interface controller 108, display controller 109, hard disk drive 110, keyboard 111, serial peripheral equipment 112, parallel peripheral equipment 113 and display 114. Among above devices, CPU 101, RAM 102, ROM 103, hard disk drive controller 105, keyboard controller 106, serial interface controller 107, parallel interface controller 108 and display controller 109 are coupled to the system bus 104. Hard disk drive 110 is coupled to hard disk drive controller 105. Keyboard 111 is coupled to keyboard controller 106. Serial peripheral equipment 112 is coupled to serial interface controller 107. Parallel peripheral equipment 113 is coupled to parallel interface controller 108. And, Display 114 is coupled to display controller 109. It should be understood that the structure as shown in FIG. 2 is only for the exemplary purpose rather than any limitation to the present disclosure. In some cases, some devices may be added to or removed from the computer system 100 based on specific situations.

Data deduplication techniques can be divided into file-level and data chunk-level deduplication techniques according to deduplication granularity. File-level deduplication is also called as Single Instance Store (SIS). Data chunk-level deduplication has less duplicated data than file-level deduplication after deduplication, and hence has been widely employed in current mainstream deduplication products.

Figure 3:
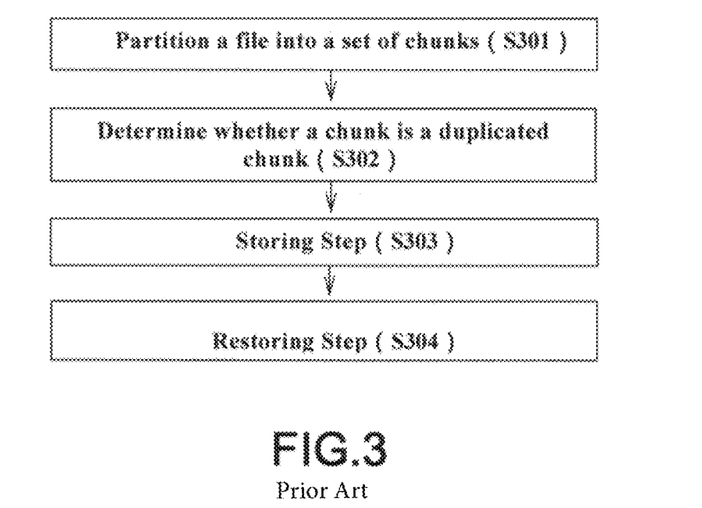
FIG. 3 shows the steps of a data chunk-level deduplication procedure.

The procedure of data chunk-level deduplication in a storage system can be described with reference to FIGS. 1 and 3. FIG. 3 shows the steps of a data chunk-level deduplication procedure. According to FIG. 3, at step S301, a data file is partitioned into a group of data chunks. At step S302, it is determined whether a data chunk is a duplicated data chunk. At step S303 (a storing step), in a stored logical file, for each non-duplicated data chunk, which is indicated to be a new and unique data chunk, the meta data of the data chunk is stored, generally in a database, and the actual content of the data chunk is stored into a storage device, for example, a mass storage device, such as a hard disk drive or tape. For a duplicated data chunk, the duplicated storing of the data chunk is skipped in the storage medium. At step S304 (a restoring step), the meta data of each data chunk is read out, and then a corresponding data chunk is retrieved according to the information contained in the meta data for restoring a physical copy of the file.

Wherein, during the data chunk partition, the partitioned data chunks can be fixed size or varied size data chunks. Regardless of which kind of data chunk, the determination of whether a data chunk is a duplicated data chunk is based on the fingerprint of that data chunk, which is an intrinsic feature of the data chunk. Desirably, each data chunk has its unique fingerprint, different data chunks have different fingerprints, and data chunks with an identical fingerprint are identical data chunks. When multiple data chunks have been obtained, hash search can be used to rapidly determine whether a data chunk is a duplicated data chunk. The meta data of a data chunk comprises at least: data chunk ID for uniquely identifying a data chunk; offset, representing offset location of a data chunk in a data object; data chunk size, representing the size of a data chunk; link-to-data chunk ID, and for a new data chunk, identifying the storage position of the data chunk in a storage medium, for a deduplicated data chunk, identifying the ID of a retained data chunk which the deduplicated data chunk points to. Original data can be stored in a database (if any) in many manners, Table 1 shows an example format for recording meta data of a data object in a relational database, in which in addition to the above meaning, data chunk ID also represents a unique number of a data chunk in the database; data object ID represents a unique number of a data object in the database, because there are possible many data objected stored in a database table, as specified in that column.

TABLE 1 an example format for recording meta data of a data object in a relational database

| Data chunk ID | offset | Data chunk size | Data object ID | Link-to-data chunk ID |
| --- | --- | --- | --- | --- |
|  |  |  |  |  |

It is known in the art that the relational database table is merely an example format, those skilled in the art may employ other database formats, for example, XML database. Alternatively, the meta data can be expressed in a text file, XML file, etc, instead of being recorded in a database.

It can be known from the above description, data chunk-level deduplication comprises: data chunk partition, data chunk fingerprint calculation, as described in sequence below.

(1) Data Chunk Partition

Currently, there are mainly three kinds of data chunk partition algorithms, that is, fixed size partition, content-defined data chunking (CDC) and sliding block data chunking (SBC).

The fixed size partition algorithm partitions a file with a predetermined data chunk size, and implements weak checksum and MD5 strong checksum verification. The weak checksum is mainly used to improve differential encoding performance. The weak checksum is calculated first, and then hash search is performed. If matched, a MD5 strong checksum is calculated, followed by a further hash search. Because the calculation intensity of the weak checksum is far less than that of MD5, encoding performance can be effectively improved. Fixed size partition has the advantages of simplicity and high performance, and the disadvantages of highly sensitive to data inserting and deleting, low processing efficiency and incapable of adapting and optimizing according to content changes.

CDC (content-defined data chunking) algorithm is a varied size partition algorithm, which applies a strategy of partitioning a file into data chunks with different sizes by using data fingerprint such as Rabin fingerprint. Different from the fixed size partition algorithm, data chunks are partitioned based on the file content in the CDC algorithm, resulting in variable data chunk size. During the execution of the algorithm, a fixed size (such as 48 bytes) slide window is used in CDC to calculate a data fingerprint for the file data. If the fingerprint satisfies a certain condition, such as if the mod of its value with a specific integer is equal to a predetermined value, the position of the window is determined as the boundary of a data chunk. Ill conditions may occur in the CDC algorithm, such as, unsatisfied fingerprint condition, undefined chuck boundary, over-large data chunks. In practice, this problem can be solved by restricting data chunk size through specifying upper and lower limits. The CDC algorithm is insensitive to changes in file content, such that merely a few data chunks are influenced by data inserting or deleting, while other data chunks are kept unchanged. However, the CDC algorithm has defects of difficult determination of data chunk size, large overhead in the case of too fine granularity, and unfavorable deduplication when granularity is too large. There is a challenge on how to balance and compromise therebetween.

The sliding block algorithm combines the advantages of fixed size partition and CDC together, in which data chunk size is fixed. The weak checksum is calculated first, and the MD5 strong checksum is calculated only if a match has been found. A boundary of a data chunk is determined when both of them are matched. Data fragment before a data chunk is treated as a data chunk as well, the length of which is variable. If the slide window passes a distance of the length of a data chunk without finding a match, the boundary of a data chunk is also determined. The sliding block algorithm is very efficient to data inserting and deleting problems. Further, more redundant data can be detected as compared to CDC. One drawback of the sliding block algorithm is the frequent occurrence of data fragments.

(2) Data Chunk Fingerprint Calculation

Commonly, a data chunk per se is quite large, and the target of data fingerprints representation is to distinguish different data chunks with shorter data representations (such as 16, 32, 64 128 bytes). A data fingerprint can be obtained through relative mathematic operations performed on content of a data chunk. From the point of view of current researches, hash function relatively approximates to the desirable target, such as MD5, SHA1, SHA-256, SHA-512, one-way, Rabin hash, etc. Furthermore, many character string hash functions can be used in data chunk fingerprint calculation. Unfortunately, however, those fingerprint functions suffer from the collision problem, that is, generating the same data fingerprint for different data chunks. Comparatively, the MD5 and SHA series hash functions have a very low probability of collision, and therefore are commonly used in fingerprint calculation. Wherein, MD5 and SHA1 are 128 bits. SHA-X (X represents the number of bits) has a lower probability of collision, while the calculation intensity of which is significantly increased. In practice, it is needed to make a compromise between performance and security. Furthermore, multiple hash algorithms can be used simultaneously in the fingerprint calculation of a data chunk.

However, deduplication ratio of the data is fixed after removing duplicately stored data chunks through current data chunk deduplication technologies. A method and system for further improving deduplication ratio of data are proposed in the present disclosure. In the method, new data chunks obtained through data chunk deduplication are further combined into a new data object, and duplicated data in the newly combined data object is further removed using an existing deduplication method, so that memory space occupied by those data chunks can be further reduced.

The method will be described in detail below. A simple example is employed in all steps throughout the method for the clarity and apparentness of this description. In that example, an original data object is assumed as "abcdef ghabc abcdef defgh ghabc ghabc abcdef ghabc defgh", three different data chunks are obtained through implementing deduplication to remove redundant data chunks in the data object using a data chunk-level deduplication method in the prior art:

Data chunk A: abcdef
Data chunk B: ghabc
Data chunk C: defgh

Table 2 shows the meta data of the original data object in the database table format shown in table 1. Wherein, data chunk ID is a unique number representing a data chunk in a database, which may also represent the sequence of the data chunk in the original data object at the same time. Data object ID represents a number for uniquely identifying a data object in a database, just as in table 2. Offset represents the offset location of the data chunk in the original data object. Data chunk size represents the size of the data chunk in the original data object. Wherein the link-to-data chunk ID column is filled in with data chunk as a substitution, actually representing the offset location of data chunk A stored in a storage medium. Obviously, the same offset locations in a storage medium listed in the link-to-data chunk ID column represent duplicated data chunks.

TABLE 2 meta data of original data object in the database table format shown in table 1.

| Data chunk ID | offset | Data chunk size | Data object ID | Link-to-data chunk ID |
| --- | --- | --- | --- | --- |
| 1 | 0 | 6 | 1 | A |
| 2 | 6 | 5 | 1 | B |
| 3 | 11 | 6 | 1 | A |
| 4 | 17 | 5 | 1 | C |
| 5 | 22 | 5 | 1 | B |
| 6 | 27 | 5 | 1 | B |
| 7 | 32 | 6 | 1 | A |
| 8 | 38 | 5 | 1 | B |
| 9 | 43 | 5 | 1 | C |

Figure 4:
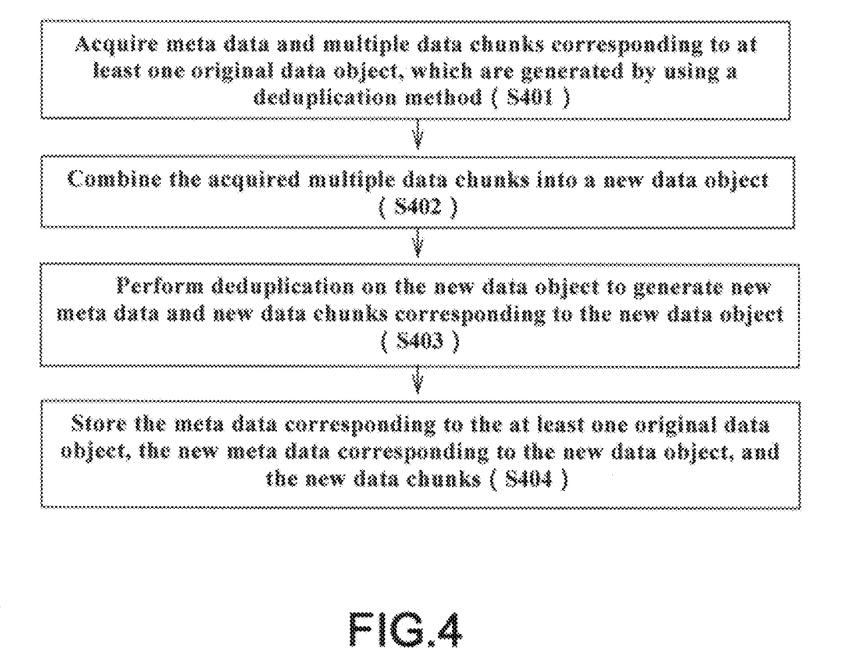
FIG. 4 shows the steps of a method for data deduplication according to one implementation of the present disclosure.

Based on the above example, the method of the present disclosure and the result of applying the method to the above example will be described below. In this example, it is merely described to logically combine different data chunks of a data object into a new data object. In practice, data chunks of different data objects can be logically combined into a new data object with a similar method. FIG. 4 shows the steps of a data deduplication method according to one embodiment of the present disclosure. According to FIG. 4, at acquiring step S401, meta data and multiple data chunks corresponding to at least one original data object which are obtained by using a data deduplication method, are acquired. For the above example, the meta data and the three data chunks corresponding to the original data object are acquired. It is specified in the meta data that the original data object comprises nine data chunks.

At combining step S402, the multiple data chunks acquired are combined into a new data object. For the above example, that is, data chunk A, data chunk B and data chunk C are combined into a new data object "abcdef ghabc defgh". At combining step S402, during combining corresponding data chunks acquired into the new data object, those data chunks corresponding to the original data object can be combined into a new data object in any order. If features of those data chunks are unaware, random combination order can be employed; if features of those data chunks are aware and a regular feature of the data is acquired, then the combination order can be specified.

At removing step S403, deduplication is implemented on the new data object, to obtain new meta data and new data chunks corresponding to the new data object. For the above example, two new data chunks are obtained, that is, data chunk D "abcd" and data chunk E "efgh". Obviously, storage space occupied by those new data chunks is further reduced as compared to that occupied by the original data chunks. In addition, when implementing deduplication on the new data object to obtain new meta data and new data chunks corresponding to the new data object, the deduplication method used for the original data object can be employed, or a data deduplication method different from that used for the original data object can be employed, even if a different data deduplication method is used, since meta information of data chunks has been recorded, no issue for data restoration may occur.

At storing step S404, the meta data corresponding to the at least one original data object, the new meta data corresponding to the new data object, and the new data chunks are stored. During storing the meta data corresponding to the at least one original data object, the new meta data corresponding to the new data object, and the new data chunks, the meta data corresponding to the at least one original data object and the new meta data can be stored in a database. Table 3 shows a database table format for meta data of the present disclosure, wherein two different data object IDs are used to identify the original data object and the new data object. For example, 1 represents the original data object, and 2 represents the new data object. Also, the correspondence between the two different data objects is recorded. The correspondence specifies which data object ID is employed by the meta data corresponding to the original data object, and which data object ID is employed for the new data object. The column of link-to data chunk ID in the table for the meta data corresponding to the original data object is represented by the offset location of a data chunk in the new data object. For example, in table 3, in the row having the corresponding data chunk ID 1, in the link-to-data chunk ID column, "2" represents that the new data object derived from the data object 1 is object 2, "0" of "2-0" represents the offset location of data chunk 1 in the new data object "abcdef ghabc defgh". "D" and "E" in the link-to-data chunk ID column represent the offset locations of data chunks D and E in the storage medium respectively.

TABLE 3 a database table format for meta data of the present disclosure

| Data chunk ID | offset | Data chunk size | Data object ID | Link-to-data chunk ID |
|---|---|---|---|---|
| 1 | 0 | 6 | 1 | 2-0 |
| 2 | 6 | 5 | 1 | 2-6 |
| 3 | 11 | 6 | 1 | 2-0 |
| 4 | 17 | 5 | 1 | 2-11 |
| 5 | 22 | 5 | 1 | 2-6 |
| 6 | 27 | 5 | 1 | 2-6 |
| 7 | 32 | 6 | 1 | 2-0 |
| 8 | 38 | 5 | 1 | 2-6 |
| 9 | 43 | 5 | 1 | 2-11 |
| 10 | 0 | 4 | 2 | D |
| 11 | 4 | 4 | 2 | E |
| 12 | 8 | 4 | 2 | D |
| 13 | 12 | 4 | 2 | E |

In another embodiment, tables 4 and 5 show another database format for meta data of the present disclosure. In table 4, the original data object and the new data object are represented by one data object ID, and the link-to-data chunk ID column of the table for the meta data corresponding to the original data object is represented by its data chunk representation in the original data object, that is, data chunk A, data chunk B and the like. The identical data chunks are represented by the same ID, "D" and "E" in the link-to-data chunk ID column represent the offset locations of data chunks D and E in the storage medium respectively. In table 5, the mapping relationship between the data chunks of the original data object and the new data object is specified. The correspondence between two different data objects can be represented in another method by combination of the data chunk representation listed in the link-to-data chunk ID column of table 4 and table 5: the link-to-data chunk ID column of the table for the meta data corresponding to the original data object represents the location of the data chunk in the new data object.

TABLE 4 a table format for representing the original data object and the new data object with one data object ID

| Data chunk ID | Offset | Data chunk size | Data object ID | Link-to-data chunk ID |
|---|---|---|---|---|
| 1 | 0 | 6 | 1 | A |
| 2 | 6 | 5 | 1 | B |
| 3 | 11 | 6 | 1 | A |
| 4 | 17 | 5 | 1 | C |
| 5 | 22 | 5 | 1 | B |
| 6 | 27 | 5 | 1 | B |
| 7 | 32 | 6 | 1 | A |
| 8 | 38 | 5 | 1 | B |
| 9 | 43 | 5 | 1 | C |
| 10 | 0 | 4 | 1 | D |
| 11 | 4 | 4 | 1 | E |
| 12 | 8 | 4 | 1 | D |
| 13 | 12 | 4 | 1 | E |

TABLE 5 the mapping relationship between the data chunks of the original data object and the new data object

| Data chunks of data object 1 | Data chunks of data object 2 |
|---|---|
| A | Data chunk D + start portion of data chunk E (ef) |
| B | end portion of Data chunk D (gh) + start portion of data chunk E (abc) |
| C | end portion of data chunk D (d) + data chunk E |

Furthermore, according to the two embodiments above, those skilled in the art can design various simpler or more complicated database formats to record the meta data corresponding to the original data object and the new meta data corresponding to the new data object. A record method is suitable so long as the at least one original data object can be restored from the two sets of recorded meta data. In a storage medium, however, only the new data chunks of the new data object need to be stored.

In another preferable embodiment, the method may further comprise, after storing step S404, restoring the at least one original data object (not shown in FIG. 4) based on the stored meta data corresponding to the original data object, the new meta data corresponding to the new data object and the new data chunks. The specific restoration method depends on the specific record manner in the database. For example, as to the manner shown in table 3, all data chunks having data object ID 2 are retrieved first, and all data chunks stored for data object 1 can be obtained through restoring each of them according to its Data chunk ID, Offset, Data chunk size and Link-to-data chunk ID. Then, the original data object can be restored based on the Data chunk ID, Offset, Data chunk size and Link-to-data chunk ID of data object 1. As to the record manner of tables 4 and 5, the data chunks of the original data object can be directly restored, and thus the original data object can be restored in combination with the meta data of the original data object.

In one preferable embodiment, the method may further comprise, before storing step S404, taking the obtained new meta data and new data chunks corresponding to the new data object as meta data and data chunks corresponding to another original data object, repeating combining step S402 through removing step S403, until the new data chunk obtained in the present execution are identical to that obtained from the previous execution of combining step S402 through removing step S403 (not shown in FIG. 4). At this point, at storing step S304, the meta data corresponding to the original data object, the new meta data obtained through repeating the execution of combining step S402 through removing step S403 each time, and the new data chunks obtained in the last execution of combining step S402 through removing step S403, are stored.

In the data restoring step of this embodiment, it is necessary to progressively restore a new data object of each iteration of the execution of combining step S402 and removing step S403 or data chunks before each iteration of the execution of combining step S402 and removing step S403, according to the meta data corresponding to the at least one original data object, the new meta data obtained through repeating the execution of combining step S402 and removing step S403 each time, and the new data chunk obtained in the last execution of combining step S402 and removing step S403, so as to obtain the at least one original data object.

If combining step S402 and removing step S403 are executed iteratively, meta data corresponding to the original data object and multiple new meta data are stored in the database. Also, the database table format show in table 3 or in the combination of table 4 and table 5 can be used, except that the correspondence of multiple different data objects has to be recorded in table 3. The correspondence specifies which data object ID is employed by the meta data corresponding to the original data object, which level a data object ID of a new data object belongs to (i.e., from which iteration of combining step S402 and removing step S403 a data object ID the new data object is derived), and specifies the offset locations of data chunks in corresponding new data object, which correspond to the original data object and each iteration of combining step S402 and removing step S403 except for the last one. Only new data chunks obtained from the last iteration of combining step S402 and removing step S403 have their offset locations in the storage medium listed in the link-to-data chunk ID column. Table 4 used one data object ID to identify the original data object and the new data object of each level, and data chunk IDs are listed in the link-to-data chunk ID column for meta data corresponding to the original data object, and data chunk IDs are also listed in the link-to-data chunk ID column for new meta data obtained from each iteration of combining step S402 and removing step S403, only offset locations in the storage medium of new data chunks obtained from the last iteration of combining step S402 and removing step S403 are listed in the link-to-data chunk ID column for those data chunks. In this implementation, it is also necessary to record the mapping relationship between data chunks corresponding to the original data object and data chunks corresponding to the new data object of each level. In doing so, during the restoring process, new data object on which deduplication is implemented iteratively or data chunks of each level can be progressively restored, such that the original data objects can be restored.

Figure 5:
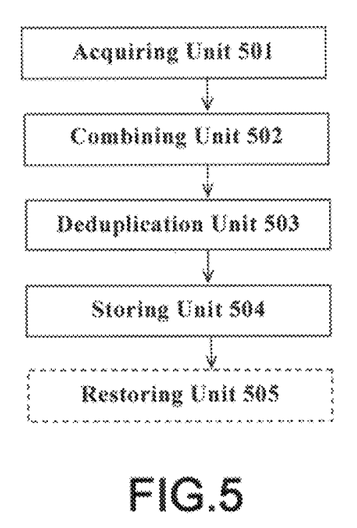
FIG. 5 shows a structural view of a system for data deduplication according to one implementation of the present disclosure.

Based on the same inventive concepts, a data deduplication system is also provided in the present disclosure. FIG. 5 shows a structural diagram of a data deduplication system according to one embodiment of the present disclosure. According to FIG. 5, the system comprises: an acquiring unit 501, configured to acquire meta data and multiple data chunks corresponding to at least one original data object, which are generated by using a data deduplication method; a combining unit 502, configured to combine the multiple data chunks acquired into a new data object; a deduplication unit 503, configured to perform deduplication on the new data object to generate new meta data and new data chunks corresponding to the new data object; and a storing unit 504, configured to store the meta data corresponding to the at least one original data object, the new meta data corresponding to the new data object and the new data chunks.

In one preferable implementation, the system shown in FIG. 5 further comprises a restoring unit 505, configured to restore the at least original data object based on the stored meta data corresponding to the at least original data object, the new meta data corresponding to the new data object and the new data chunks.

In another preferable implementation, the system further comprises an iterating unit (not shown in FIG. 5), configured to, taking the new meta data and new data chunks corresponding to the new data object obtained as the meta data and data chunks corresponding to another original data object, repeat the execution of the combining unit and the deduplication unit, until the new data chunks obtained in the present execution are identical to that obtained from the previous execution of the combining unit and the deduplication unit. At that point, it is insignificant to further repeat the execution of the combining unit and the deduplication unit, because no duplicated data can be found by in the present manner any more. At that point, the storing unit further configured to store the meta data corresponding to the original data object, the new meta data obtained through each iteration of the execution of the combining unit and the deduplication unit, and the new data chunks obtained in the last execution of the combining unit and the deduplication unit. The restoring unit is further configured to, based on the meta data corresponding to the at least one original data object, the new meta data obtained through each iteration of the execution of the combining unit and the deduplication unit, and the new data chunks obtained in the last execution of the combining unit and the deduplication unit, progressively restore the new data object of each iteration of the execution of the combining unit and the deduplication unit or data chunks before each iteration of the execution of the combining unit and the deduplication unit, so as to obtain the at least one original data object.

In the system of the present disclosure, meta data corresponding to the at least one original data object and new data object are stored in a database. The correspondence between the at least one original data object and the new data object is also recorded. wherein the meta data corresponding to the at least one original data object and new data object comprise at least data chunk ID, offset, data chunk size, link-to-data chunk ID columns in a database table. Wherein the link-to-data chunk ID column of the meta data corresponding to the at least one original data object in the database table specifies the location of each data chunk in a new data object, and the link-to-data chunk ID column of meta data corresponding to new data object in the database table specifies the location of a data chunk in a storage medium.

The present disclosure may be implemented in the form of hardware, software or a combination of hardware and software. In one preferable implementation, the present disclosure is implemented as software, which comprises but not limited to firmware, resident software, micro-code, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a hard disk drive and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices, including but not limited to, keyboards, displays, pointing devices, and the like, can be coupled to the system either directly or through an intervening I/O controller.

A network adapter may also be coupled to the system such that the data processing system can be coupled to other data processing systems or remote printers or storage devices through an intervening private or public network. Modem, cable modem and Ethernet card are just a few of the currently available types of network adapters.

It should be appreciated from the above description, various modification and changes can be made to various embodiments of the present disclosure without departing from the substantial spirit of the present disclosure. The description of this specification is merely illustrative and should not be construed as limiting. The scope of the present disclosure is merely defined by the following claims.

What is claimed is:

1. A method for data deduplication, comprising:
   acquiring meta data and data chunks corresponding to at least one original data object, wherein the data chunks are generated by performing a deduplication;
   combining the acquired data chunks into a new data object;
   performing an additional deduplication on the new data object to generate new meta data and new data chunks corresponding to the new data object;
   storing the meta data corresponding to the at least one original data object, the new meta data corresponding to the new data object, and the new data chunks; and
   using the new meta data and the new data chunks corresponding to the new data object as meta data and data chunks corresponding to another original data object, iterating through the combining of the data chunks into another new data object and the performing of the additional deduplication until new data chunks obtained in a present iteration from the additional deduplication are identical to data chunks obtained from a previous iteration.

2. The method of claim 1, further comprising:
   restoring the at least one original data object based on the stored meta data corresponding to the at least one original data object, the new meta data corresponding to the new data object, and the new data chunks.

3. The method of claim 1, further comprising:
   storing the meta data corresponding to the at least one original data object, the new meta data obtained through each iteration, and the new data chunks obtained in a last iteration.

4. The method of claim 3, further comprising:
   using the meta data corresponding to the at least one original data object, the new meta data obtained through each iteration, and the new data chunks obtained in the last iteration, progressively restoring the another new data object of each iteration to obtain the at least one original data object.

5. The method of claim 1, wherein the meta data corresponding to the at least one original data object and the new data object are stored in a database with a correspondence between the at least one original data object and the new data object, wherein, in the database, columns in a table for the meta data corresponding to the at least one original data object and the new data object include at least a data chunk ID column, an offset column, a data chunk size column, and a link-to-data chunk ID column.

6. The method of claim 5, wherein the link-to-data chunk ID column of the meta data corresponding to the at least one original data object in the database table specifies locations in the new data object of the new data chunks, and the link-to-data chunk ID column of the meta data corresponding to the new data object in the database table specifies locations in a storage medium of the new data chunks.

7. A computer program product for data deduplication, the computer program product comprising:
   a non-transitory computer-readable medium having program code embodied therein, the computer readable program code, when executed by at least one processor of a computer, is configured to perform:
   acquiring meta data and data chunks corresponding to at least one original data object, wherein the data chunks are generated by performing a deduplication;
   combining the acquired data chunks into a new data object;
   performing an additional deduplication on the new data object to generate new meta data and new data chunks corresponding to the new data object;
   storing the meta data corresponding to the at least one original data object, the new meta data corresponding to the new data object, and the new data chunks; and
   using the new meta data and the new data chunks corresponding to the new data object as meta data and data chunks corresponding to another original data object, iterating through the combining of the data chunks into another new data object and the performing of the additional deduplication until new data chunks obtained in a present iteration from the additional deduplication are identical to data chunks obtained from a previous iteration.

8. The computer program product of claim 7, wherein the computer readable program code, when executed by the at least one processor of the computer, is configured to perform:
   restoring the at least one original data object based on the stored meta data corresponding to the at least one original data object, the new meta data corresponding to the new data object, and the new data chunks.

9. The computer program product of claim 7, wherein the computer readable program code, when executed by the at least one processor of the computer, is configured to perform:
   storing the meta data corresponding to the at least one original data object, the new meta data obtained through each iteration, and the new data chunks obtained in a last iteration.

10. The computer program product of claim 9, wherein the computer readable program code, when executed by the at least one processor of the computer, is configured to perform:
    using the meta data corresponding to the at least one original data object, the new meta data obtained through each iteration, and the new data chunks obtained in the last iteration, progressively restoring the another new data object of each iteration to obtain the at least one original data object.

11. The computer program product of claim 7, wherein the meta data corresponding to the at least one original data object and the new data object are stored in a database with a correspondence between the at least one original data object and the new data object, wherein, in the database, columns in a table for the meta data corresponding to the at least one original data object and the new data object include at least a data chunk ID column, an offset column, a data chunk size column, and a link-to-data chunk ID column.

12. The computer program product of claim 11, wherein the link-to-data chunk ID column of the meta data corresponding to the at least one original data object in the database table specifies locations in the new data object of the new data chunks, and the link-to-data chunk ID column of the meta data corresponding to the new data object in the database table specifies locations in a storage medium of the new data chunks.

13. A data deduplication system, comprising:
at least one processor; and
a storage device coupled to the at least one processor, wherein the storage device stores program code, and wherein the processor is configured to execute the program to perform operations, wherein the operations comprise:
acquiring meta data and data chunks corresponding to at least one original data object, wherein the data chunks are generated by performing a deduplication;
combining the acquired data chunks into a new data object;
performing an additional deduplication on the new data object to generate new meta data and new data chunks corresponding to the new data object;
storing the meta data corresponding to the at least one original data object, the new meta data corresponding to the new data object, and the new data chunks; and
using the new meta data and the new data chunks corresponding to the new data object as meta data and data chunks corresponding to another original data object, iterating through the combining of the data chunks into another new data object and the performing of the additional deduplication until new data chunks obtained in a present iteration from the additional deduplication are identical to data chunks obtained from a previous iteration.

14. The data deduplication system of claim 13, wherein the operations further comprise:
restoring the at least one original data object based on the stored meta data corresponding to the at least one original data object, the new meta data corresponding to the new data object, and the new data chunks.

15. The data deduplication system of claim 13, wherein the operations further comprise:
storing the meta data corresponding to the at least one original data object, the new meta data obtained through each iteration, and the new data chunks obtained in a last iteration.

16. The data deduplication system of claim 15, wherein the operations further comprise:
using the meta data corresponding to the at least one original data object, the new meta data obtained through each iteration, and the new data chunks obtained in the last iteration, progressively restoring the another new data object of each iteration to obtain the at least one original data object.

17. The data deduplication system of claim 13, wherein the meta data corresponding to the at least one original data object and the new data object are stored in a database with a correspondence between the at least one original data object and the new data object, wherein, in the database, columns in a table for the meta data corresponding to the at least one original data object and the new data object include at least a data chunk ID column, an offset column, a data chunk size column, and a link-to-data chunk ID column.

18. The data deduplication system of claim 17, wherein the link-to-data chunk ID column of the meta data corresponding to the at least one original data object in the database table specifies locations in the new data object of the new data chunks, and the link-to-data chunk ID column of the meta data corresponding to the new data object in the database table specifies locations in a storage medium of the new data chunks.

* * * * *